United States Patent
Best et al.

(10) Patent No.: US 7,865,494 B2
(45) Date of Patent: Jan. 4, 2011

(54) PERSONALIZED INDEXING AND SEARCHING FOR INFORMATION IN A DISTRIBUTED DATA PROCESSING SYSTEM

(75) Inventors: Steven Francis Best, Georgetown, TX (US); Michael Wayne Brown, Georgetown, TX (US); Michael Richard Cooper, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/828,084

(22) Filed: Jul. 25, 2007

(65) Prior Publication Data

US 2007/0271247 A1 Nov. 22, 2007

Related U.S. Application Data

(63) Continuation of application No. 10/464,892, filed on Jun. 19, 2003, now abandoned.

(51) Int. Cl.
G06F 17/30 (2006.01)

(52) U.S. Cl. .................. 707/707; 709/201; 705/27; 707/732

(58) Field of Classification Search .............. 707/3, 707/4, 726, 731, 732, 733, 707; 705/27; 709/201

See application file for complete search history.

(56) References Cited

U.S. PATENT DOCUMENTS

| | | | |
|---|---|---|---|
| 5,809,250 A | 9/1998 | Kisor | |
| 5,813,014 A | 9/1998 | Gustman | |
| 5,850,442 A | 12/1998 | Muftic | |
| 5,937,163 A | 8/1999 | Lee et al. | |
| 5,954,798 A | 9/1999 | Shelton et al. | |
| 6,009,459 A | 12/1999 | Belfiore et al. | |
| 6,092,064 A | 7/2000 | Aggarwal et al. | |
| 6,094,649 A | 7/2000 | Bowen et al. | |
| 6,266,663 B1 | 7/2001 | Fuh et al. | |
| 6,285,999 B1 | 9/2001 | Page | |
| 6,327,628 B1 * | 12/2001 | Anuff et al. | .................. 719/311 |
| 6,351,755 B1 | 2/2002 | Najork et al. | |
| 6,421,675 B1 | 7/2002 | Ryan et al. | |
| 6,505,197 B1 | 1/2003 | Sundaresan et al. | |

(Continued)

OTHER PUBLICATIONS

Ramona Winkler, Portals—The All-In-One Web Supersites: Features, Functions, Definitions, Taxonomy, Feb. 16, 2003, pp. 1-11.*

*Primary Examiner*—Luke S. Wassum
*Assistant Examiner*—Sherief Badawi
(74) *Attorney, Agent, or Firm*—Edward J. Lenart; Jill Poimboeuf; Biggers & Ohanian, LLP

(57) ABSTRACT

Personalized searching including providing in a search portal a personal search term list; receiving from a user a navigation identification message; and inserting index records in a personalized search index. Inserting index records in a personalized search index typically comprises retrieving a document from a navigation location and indexing the navigation location and keywords from the personal search term list that occur in the retrieved document. A navigation identification message may comprise a search keyword and inserting index records in a personalized search index may include indexing the search keyword with the navigation location in the personalized search index. Embodiments typically include creating and transmitting to users, in dependence upon the personalized search index, search criteria, and user identification, responses to search query messages.

18 Claims, 11 Drawing Sheets

U.S. PATENT DOCUMENTS

| | | |
|---|---|---|
| 6,519,602 B2 | 2/2003 | Sundaresan et al. |
| 6,691,106 B1 * | 2/2004 | Sathyanarayan .................... 1/1 |
| 6,734,886 B1 | 5/2004 | Hagan et al. |
| 6,810,395 B1 * | 10/2004 | Bharat ............................... 1/1 |
| 7,594,011 B2 * | 9/2009 | Chandra ...................... 709/224 |
| 2002/0049727 A1 * | 4/2002 | Rothkopf ....................... 707/1 |
| 2002/0107853 A1 | 8/2002 | Hofmann et al. |
| 2002/0116386 A1 * | 8/2002 | Fabri et al. ................. 707/100 |
| 2002/0156686 A1 | 10/2002 | Kraft et al. |
| 2002/0173971 A1 * | 11/2002 | Stirpe et al. .................... 705/1 |
| 2003/0004996 A1 | 1/2003 | Novaes |
| 2003/0028451 A1 * | 2/2003 | Ananian ...................... 705/27 |
| 2003/0050863 A1 * | 3/2003 | Radwin ....................... 705/27 |
| 2003/0091671 A1 | 5/2003 | Serener-Thielmann |
| 2003/0105744 A1 * | 6/2003 | McKeeth ....................... 707/3 |
| 2005/0131866 A1 * | 6/2005 | Badros et al. ................. 707/3 |
| 2005/0160083 A1 * | 7/2005 | Robinson ...................... 707/3 |
| 2005/0216457 A1 * | 9/2005 | Walther et al. ................ 707/4 |

\* cited by examiner

| | Personalized Search Index | | | |
|---|---|---|---|---|
| 552 | Keyword | UserID | Priority | URI |
| 554 | IBM | john | 1 | www.ibm.com |
| 556 | IBM | jim | 3 | www.ibm.com |
| 558 | IBM | mike | 4 | www.ibm.com |
| | IBM | tim | 2 | www.ibm.com |
| 560 | Web | mike | 2 | www.ibm.com |
| 562 | Portal | mike | 2 | www.ibm.com |
| 564 | Java | sue | 1 | www.ibm.com |
| 566 | Java | sally | 1 | www.ibm.com |
| | Java | tim | 2 | www.ibm.com |
| 568 | | | | |
| | ↑ 570 | ↑ 572 | ↑ 574 | ↑ 576 |

FIG. 4

Personalized Search Index

| | Keyword | UserID | Priority | URI |
|---|---|---|---|---|
| 902 | mine | john | 6 | www.geology.com |
| 904 | mine | tim | 4 | www.geology.com |
| 906 | marine | mike | 5 | www.geology.com |
| 908 | geology | tim | 3 | www.geology.com |
| 910 | geology | sue | 2 | www.geology.com |
| 912 | geology | sue | 1 | www.geology.com |
| 914 | mine | john | 6 | www.uchicaco.edu |
| 916 | mine | tim | 5 | www.uchicaco.edu |
| 918 | coastal | mike | 4 | www.uchicaco.edu |
| 920 | geology | tim | 1 | www.uchicaco.edu |
| 922 | geology | jim | 2 | www.uchicaco.edu |
| 924 | geology | sally | 1 | www.uchicaco.edu |
| 926 | mine | john | 6 | www.coastal.gov |
| 928 | mine | tim | 5 | www.coastal.gov |
| 930 | geophysics | mike | 4 | www.coastal.gov |
| 932 | geology | tim | 3 | www.coastal.gov |
| 934 | geology | leslie | 3 | www.coastal.gov |
| 936 | geology | sue | 1 | www.coastal.gov |
| | ↑ | ↑ | ↑ | ↑ |
| | 570 | 572 | 574 | 576 |

FIG. 10

| Keyword | PartIII | Priority | URL |
|---|---|---|---|
| mine | tim | 4 | www.geology.com |
| geology | tim | 3 | www.geology.com |
| mine | tim | 5 | www.uchicago.edu |
| geology | tim | 1 | www.uchicaco.edu |
| mine | tim | 5 | www.coastal.gov |
| geology | tim | 3 | www.coastal.gov |

904 — mine row
908 — geology row
916 — mine row
920 — geology row
928 — mine row
932 — geology row 570  572  574  576

FIG. 11

| Response Entries | | | |
|---|---|---|---|
| Title | Description | URL | responsePriority |
| --- | --- | www.coastal.gov | 8 |
| --- | --- | www.geology.com | 7 |
| --- | --- | www.uchicago.edu | 6 |

PERSONALIZED INDEXING AND SEARCHING FOR INFORMATION IN A DISTRIBUTED DATA PROCESSING SYSTEM

CROSS-REFERENCE TO RELATED APPLICATION

This application is a continuation application of and claims priority from U.S. patent application Ser. No. 10/464,892, filed on Jun. 19, 2003 now abandoned.

BACKGROUND OF THE INVENTION

1. Field of the Invention

The field of the invention is data processing, or, more specifically, methods, systems, and products for personalized indexing and searching for information in a distributed data processing system.

2. Description of Related Art

An example from current art of a large distributed data processing system is the World Wide Web. Search engines on the web are basically massive full-text indexes of millions of web pages. These search engines are specialized software programs specialized to receive search query messages from users or from users' browsers, where the search query messages comprise keywords or search terms. Search engines formulate, or 'parse,' the query messages into database queries against web search databases comprising massive search indexes.

The web includes many web sites comprising many millions of web pages, each of which is a document specially structured in a markup language, such as, for example, HTML, WML, HDML, and so on, to support some hyperlinking in some data communications protocol, such as, for example, HTTP, WAP, HDTP, and so on. The search indexes for the search engines are created by software robots called 'spiders' or 'crawlers' that survey the web and retrieve documents for indexing. The indexing itself is often carried out by another software engine that takes as its input the pages gathered by spiders, extracts keywords according to some algorithm, and creates index entries based upon the keywords and URLs identifying the indexed documents.

That is, spiders gather documents into a documents database, identifying the documents to be gathered from a URL list in the documents database or through hyperlinks in the documents themselves or through other methods. Spiders take as their inputs the entire web and produce as outputs documents to be indexed. Indexing engines take as their inputs documents to be indexed and produce as their outputs search indexes. Search engines take as inputs search indexes and search request messages bearing search terms and produce as their outputs search result messages for return to requesting users' browsers.

In current art, spiders gather documents with no regard for individual users' interests or history of web navigation. In current art, index engines create search indexes with no regard for individual users' interests or history of web navigation. In current art, search engines create responses to search queries from users with no regard for individual users' interests or history of web navigation. If searches could be performed with regard for individual users' interests or history of web navigation, searches could be better focused and search results could be more pertinent to users' purposes in searching for information. There are ongoing needs for improvement, therefore, in searching and indexing information in large distributed data processing system like the web.

SUMMARY OF THE INVENTION

Methods, systems, and products are disclosed for personalized searching for information in a distributed data processing system, including providing in a search portal a personal search term list; receiving from a user a navigation identification message comprising a user identification for the search portal and a navigation location; and inserting index records in a personalized search index in dependence upon the user identification, the navigation location, and the personal search term list. In typical embodiment of the present invention, inserting index records in a personalized search index includes retrieving a document from the navigation location and indexing, in the personalized search index, the navigation location and keywords from the personal search term list that occur in the retrieved document. In typical embodiments, a navigation identification message includes a search keyword and inserting index records in a personalized search index includes indexing the search keyword with the navigation location in the personalized search index.

In typical embodiments, providing a personal search term list includes receiving in the search portal from the user a search query message comprising search criteria and the user identification and storing the search criteria in the personal search term list. Such embodiments often include authenticating the search query message. In typical embodiments, a navigation identification message includes a search keyword and providing a personal search term list includes storing the search keyword in the personal search term list. In many embodiments, providing a personal search term list includes receiving from the user and adding to the personal search term list a keyword selected by the user from within a document. In many embodiments, providing a personal search term list further comprises making the personal search term list available to a user for editing.

Many embodiments include authenticating navigation identification messages. In typical embodiments, a search portal comprises a server further comprising a search engine operating in dependence upon the personalized search index; a personal search term list comprises search keywords of interest to the user; a personalized search index comprises a search index further comprising a user identification for the search portal; and user identification for the search portal comprises data uniquely identifying the user to the search portal.

Typical embodiments include assigning priority to index entries in the personalized search index, which can be carried out, for example, by counting the number of times a navigation location is received in navigation identification messages, by counting the number of times a keyword from the personal search term list occurs in a document, or by other methods.

Typical embodiments also include establishing a user account for the user on the search portal, the user account comprising the user identification. In typical embodiments, receiving a navigation identification message comprises receiving a navigation identification message from a user's data communications application, which is often a browser.

Typical embodiments include receiving in the search portal from the user a search query message comprising search criteria and a user identification for the search portal; creating, in dependence upon the personalized search index, the search criteria, and the user identification, a response to the search query message; and transmitting the response to the user. In such embodiments, creating a response to the search query message often comprises creating a response to the query in dependence upon only the personalized search index. In other embodiments, creating a response to the search query message comprises creating a response to the search query message in dependence upon both the personalized search index and a non-personalized search index.

In typical embodiments, creating a response to a search query message comprises parsing the search criteria into a search query and asserting such a search query against the personalized search index. In typical embodiments, creating a response to a search query message comprises generating, in dependence upon assigned indications of priority for the index entries in the personalized search index, measures of priority for entries in the response and sorting response entries according to such a measure of priority for entries in the response.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 shows an exemplary personalized search index.

FIG. 10 shows an exemplary semantics-based search index.

FIG. 11 illustrates a selected subset of the records in FIG. 10.

FIG. 12 illustrates a selected subset of the records in FIG. 11.

DETAILED DESCRIPTION OF EXEMPLARY EMBODIMENTS

Introduction

Figure 1:
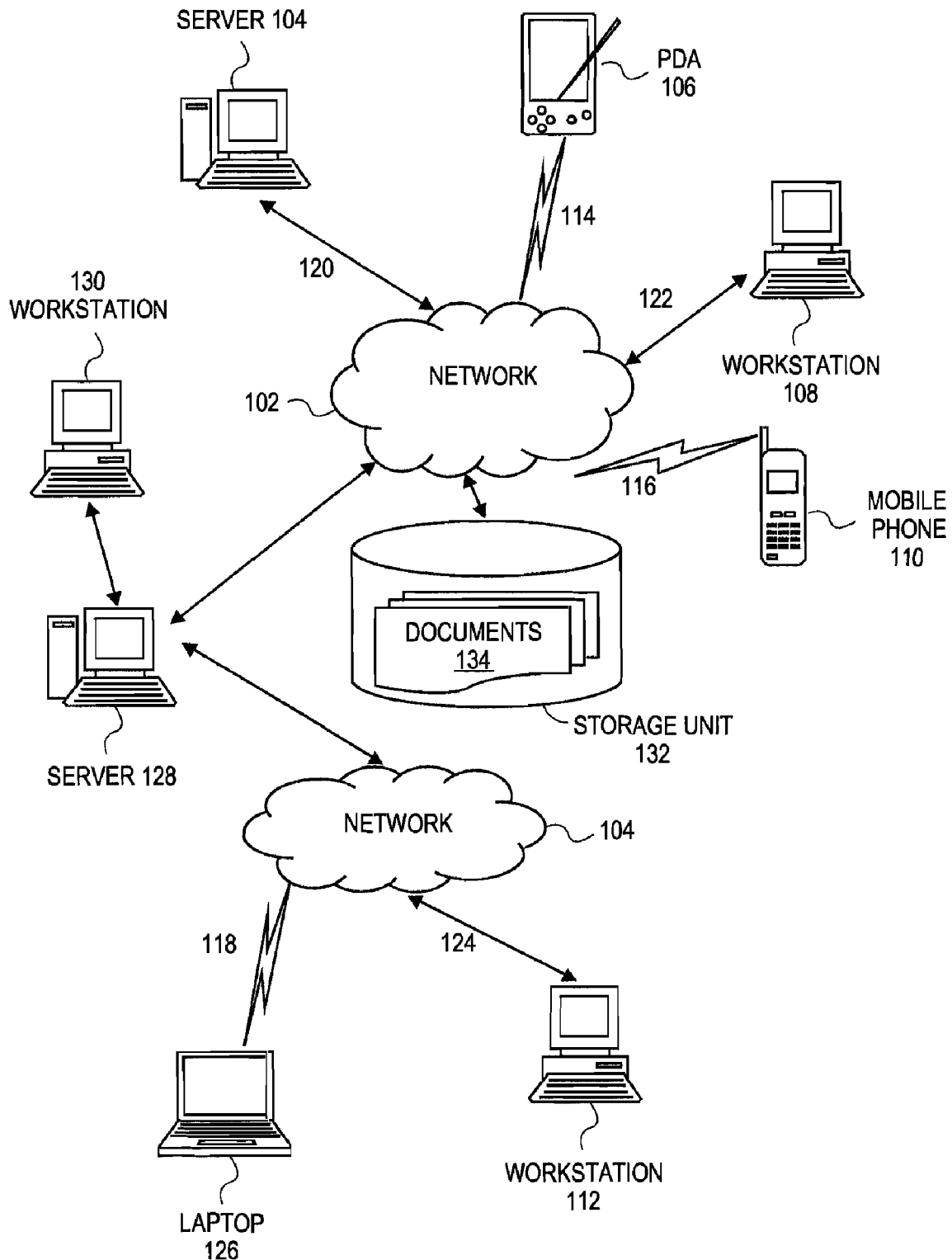
FIG. 1 depicts an architecture for a distributed data processing system in which various embodiments of the present invention may be implemented.

The present invention is described to a large extent in this specification in terms of methods for personalized indexing and searching for information in a distributed data processing system. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute," unless the context indicates otherwise, generally are used as synonyms, referring to individual elements of information, typically represented as digital data. Aggregates of data elements are referred to as "records" or "data structures." Aggregates of records are referred to as "tables" or "files." Aggregates of files or tables are referred to as "databases." In the context of tables, fields may be referred to as "columns," and records may be referred to as "rows." Complex data structures that include member methods, functions, or software routines as well as data elements are referred to as "classes." Instances of classes are referred to as "objects" or "class objects."

"802.11" refers to a family of specifications developed by the IEEE for wireless LAN technology. 802.11 specifies an over-the-air interface between a wireless client and a base station or between two wireless clients. Specification 802.11b, also known as '802.11 High Rate' or 'Wi Fi,' provides wireless network functionality similar to Ethernet.

"Browser" means a web browser, a communications application for locating and displaying web pages. Browsers typically comprise a markup language interpreter, web page display routines, and an HTTP communications client. Typical browsers today can display text, graphics, audio and video. Browsers are operative in network-enabled devices, including wireless network-enabled devices such as network-enabled PDAs and mobile telephones. Browsers in wireless network-enabled devices often are downsized browsers called "microbrowsers." Microbrowsers in wireless network-enabled devices often support markup languages other than HTML, including for example, WML, the Wireless Markup Language.

"CGI" means "Common Gateway Interface," a standard technology for data communications of resources between web servers and web clients. More specifically, CGI provides a standard interface between servers and server-side 'gateway' programs which administer actual reads and writes of data to and from files systems and databases.

"Client," "client device," or "client computer" refers to any computer, any automated computing machinery, used according to embodiments of the present invention to prepare and communicate search queries or search query messages and, in return, receive and display search results or responses. Examples of client devices are personal computers, PDAs, mobile telephones, laptop computers, and others as will occur to those of skill in the art. Various embodiments of client devices support wireline communications or wireless communications. The use as a client device of any instrument capable of administering search queries and search results is well within the present invention.

A "communications application" is any data communications software capable of operating couplings for data communications to send and receive search query messages and search responses, including browsers, microbrowsers, special purpose data communications systems, and others as will occur to those of skill in the art.

"Coupled for data communications" means any form of data communications, wireless, 802.11b, Bluetooth, infrared, radio, internet protocols such as TCP/IP, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art.

"CPU" means 'central processing unit.' The term 'CPU' as it is used in this disclosure includes any form of computer processing unit, regardless whether single, multiple, central, peripheral, or remote, in any form of automated computing machinery, including client devices, servers, and so on.

A "document" is any resource on any distributed data process system containing information amenable to indexing and searching according to embodiments of the present invention. Documents include static files in markup languages, such as static HTML files, as well as dynamically-generated content such as query results and output from CGI scripts and Java™ servlets, and output from dynamic server pages such as Active Server Pages, Java Server Pages, and others as will occur to those of skill in the art.

"GUI" means 'graphical user interface.'

"HDML" stands for 'Handheld Device Markup Language,' a markup language used to format content for web-enabled mobile phones. HDML is proprietary to Openwave Systems, Inc., and can only be operated on phones that use Openwave browsers. Rather than WAP, HDML operates over Openwave's Handheld Device Transport Protocol ("HDTP").

"HTML" stands for 'HyperText Markup Language,' a standard markup language for displaying web pages on browsers.

"HTTP" stands for 'HyperText Transport Protocol,' the standard data communications protocol of the World Wide Web.

A "hyperlink," also referred to as "link" or "web link," is a reference to a resource name or network address which when invoked allows the named resource or network address to be accessed. More particularly in terms of the present invention, invoking a hyperlink implements a request for access to a resource, generally a document. Often a hyperlink identifies a network address at which is stored a resource such as a web page or other document. Hyperlinks are often implemented as anchor elements in markup in documents. As the term is used in this specification, however, hyperlinks include links effected through anchors as well as URIs invoked through 'back' buttons on browsers, which do not involve anchors. Hyperlinks include URIs typed into address fields on browsers and invoked by a 'Go' button, also not involving anchors. In addition, although there is a natural tendency to think of hyperlinks as retrieving web pages, their use is broader than that. In fact, hyperlinks access "resources" generally available through hyperlinks including not only web pages but many other kinds of data as well as dynamically-generated server-side output from Java servlets, CGI scripts, and other resources as will occur to those of skill in the art.

"The Internet" is a global network connecting millions of computers utilizing the Internet Protocol' or 'IP' as the network layer of their networking protocol stacks, and, typically, also using the Transmission Control Protocol or 'TCP' as the transport layer of their networking protocol stacks. The Internet is decentralized by design, a strong example of a distributed data processing system. An "internet" (uncapitalized) is any network using IP as the network layer in its network protocol stack.

"LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network ("WAN"). The Internet is an example of a WAN.

"Network" is used in this specification to mean any networked coupling for data communications among computers or computer systems, clients, servers, and so on. Examples of networks useful with the invention include intranets, extranets, internets, local area networks, wide area networks, and other network arrangements as will occur to those of skill in the art.

"PDA" refers to a personal digital assistant, a handheld computer useful as a client according to embodiments of the present invention.

"Resource" means any aggregation of information administered in distributed processing systems according to embodiments of the present invention. Network communications protocols generally, for example, HTTP, transmit resources, not just files. A resource is an aggregation of information capable of being identified by a URI or URL. In fact, the 'R' in 'URI' stands for 'Resource.' The most common kind of resource is a file, but resources include dynamically-generated query results, the output of CGI scripts, dynamic server pages, and so on. It may sometimes be useful to think of a resource as similar to a file, but more general in nature. Files as resources include web pages, graphic image files, video clip files, audio clip files, files of data having any MIME type, and so on. As a practical matter, most HTTP resources, WAP resources, and the like are currently either files or server-side script output. Server side script output includes output from CGI programs, Java servlets, Active Server Pages, Java Server Pages, and so on.

"Server" in this specification refers to a computer or device comprising automated computing machinery on a network that manages resources, including documents, and requests for access to such resources. A "web server," in particular is a server that communicates with client computers through communications applications, such as browsers or microbrowsers, by means of hyperlinking protocols such as HTTP, WAP, or HDTP, in order to manage and make available to networked computers documents, digital objects, and other resources.

"SQL" stands for 'Structured Query Language,' a standardized query language for requesting information from a database. Although there is an ANSI standard for SQL, as a practical matter, most versions of SQL tend to include many extensions. This specification provides examples of database queries against semantics-based search indexes expressed as pseudocode SQL. Such examples are said to be 'pseudocode' because they are not cast in any particular version of SQL and also because they are presented for purposes of explanation rather than as actual working models.

A "Java Servlet" is a program designed to be run from another program rather than directly from an operating system. "Servlets" in particular are designed to be run on servers from a conventional Java interface for servlets. Servlets are modules that extend request/response oriented servers, such as Java-enabled web servers. Java servlets are an alternative to CGI programs.

"TCP/IP" refers to two layers of a standard OSI data communications protocol stack. The network layer is implemented with the Internet Protocol, hence the initials 'IP.' And the transport layer is implemented with the Transport Control Protocol, referred to as 'TCP.' The two protocols are used together so frequently that they are often referred to as the TCP/IP suite, or, more simply, just 'TCP/IP.' TCP/IP is the standard data transport suite for the well-known world-wide network of computers called 'the Internet.'

A "URI" or "Universal Resource Identifier" is an identifier of a named object in any namespace accessible through a network. URIs are functional for any access scheme, including for example, the File Transfer Protocol or "FTP," Gopher, and the web. A URI as used in typical embodiments of the present invention usually includes an internet protocol address, or a domain name that resolves to an internet protocol address, identifying a location where a resource, particularly a document, a web page, a CGI script, or a servlet, is located on a network, often the Internet. URIs directed to particular resources, such as particular documents, HTML files, CGI scripts, or servlets, typically include a path name or file name locating and identifying a particular resource in a file system coupled through a server to a network. To the extent that a particular resource, such as a CGI file, a servlet, or a dynamic web page, is executable, for example to store or retrieve data, a URI often includes query parameters, or data to be stored, in the form of data encoded into the URI. Such parameters or data to be stored are referred to as 'URI encoded data,' or sometime as 'form data.'

"URI encoded data" or "form data" is data packaged in a URI for data communications, a useful method for communicating variable names and values in a distributed data processing system such as the Internet. Form data is typically communicated in hyperlinking protocols, such as, for example, HTTP which uses GET and POST functions to transmit URI encoded data. In this context, it is useful to remember that URIs do more than merely request file transfers. URIs identify resources on servers. Such resource may be files having filenames, but the resources identified by URIs also may include, for example, queries to databases, including queries to search engines according to embodiments of the present invention. Results of such queries do not necessarily reside in files, but they are nevertheless data resources identified by URIs and identified by a search engine and query data that produce such resources. An example of URI encoded data is:

http://www.foo.com/cgi-bin/
MyScript.cgi?field1=value1&field2=value2

This example shows a URI bearing encoded data. The encoded data is the string "field1=value1&field2=value2." The encoding method is to string field names and field values separated by '&' and "=" with spaces represented by '+.' There are no quote marks or spaces in the string. Having no quote marks, spaces are encoded with '+,' and '&' is encoded with an escape character, in this example, '%26.' For example, if an HTML form has a field called "name" set to "Lucy", and a field called "neighbors" set to "Fred & Ethel", the data string encoding the form would be:

name=Lucy&neighbors=Fred+%26+Ethel

"URLs" or "Universal Resource Locators" comprise a kind of subset of URIs, such that each URL resolves to a network address. That is, URIs and URLs are distinguished in that URIs identify named objects in namespaces, where the names may or may not resolve to addresses, while URLs do resolve to addresses. Although standards today are written on the basis of URIs, it is still common to such see web-related identifiers, of the kind used to associate web data locations with network addresses for data communications, referred to as "URLs." This specification uses the terms URI and URL more or less as synonyms.

"WAN" means 'wide area network.' One example of a WAN is the Internet.

"WAP" refers to the Wireless Application Protocol, a protocol for use with handheld wireless devices. Examples of wireless devices useful with WAP include mobile phones, pagers, two-way radios, hand-held computers, and PDAs. WAP supports many wireless networks, and WAP is supported by many operating systems. WAP supports HTML, XML, and particularly WML (the Wireless Markup Language), which is a language particularly designed for small screen and one-hand navigation without a keyboard or mouse. Operating systems specifically engineered for handheld devices include PalmOS, EPOC, Windows CE, FLEXOS, OS/9, and JavaOS. WAP devices that use displays and access the Internet run "microbrowsers." The microbrowsers use small file sizes that can accommodate the low memory constraints of handheld devices and the low-bandwidth constraints of wireless networks.

"WML" stands for 'Wireless Markup Language,' an XML language used as a markup language for web content intended for wireless web-enabled devices that implement WAP. There is a WAP forum that provides a DTD for WML. A DTD is an XML 'Document Type Definition.'

"World Wide Web," or more simply "the web," refers to a system of internet protocol ("IP") servers that support specially formatted, hyperlinking documents, documents formatted in markup languages such as HTML, XML, WML, and HDML. The term "web" is used in this specification also to refer to any server or connected group or interconnected groups of servers that implement a hyperlinking protocol, such as HTTP, WAP, HDTP, or others, in support of URIs and documents in markup languages, regardless whether such servers or groups of servers are coupled to the World Wide Web as such.

"XML" stands for 'eXtensible Markup Language,' a language that support user-defined markup including user-defined elements, tags, and attributes. XML's extensibility contrasts with most web-related markup languages, such as HTML, which are not extensible, but which instead use a standard defined set of elements, tags, and attributes. XML's extensibility makes it a good foundation for defining other languages. WML, the Wireless Markup Language, for example, is a markup language based on XML. Modern browsers and other communications clients tend to support markup languages other than HTML, including, for example, XML.

Personalized Information Indexing

Exemplary methods, system, and products for personalized indexing of information in a distributed data processing system are now explained with reference to the accompanying drawings, beginning with FIG. 1. FIG. 1 depicts an architecture for a distributed data processing system in which various embodiments of the present invention may be implemented. The distributed data processing system of FIG. 1 includes a number of computers coupled for data communications in networks. The distributed data processing system of FIG. 1 includes networks 102, 104. Networks in such systems may comprise LANs, WANs, intranets, internets, the Internet, webs, and the World Wide Web itself. Such networks comprise media that may be used to provide couplings for data communications between various devices and computers connected together within a distributed data processing system. Such networks may include permanent couplings, such as wire or fiber optic cables, or temporary couplings made through wireline telephone or wireless communications.

In the example of FIG. 1, server 128 and server 104 are connected to network 102 along with storage unit 132. In addition, several exemplary client devices including a PDA 106, a workstation 108, and a mobile phone 110 are coupled for data communications to network 102. Network-enabled mobile phone 110 connects to network 102 through wireless link 116, and PDA 106 connects to network 102 through wireless link 114. In the example of FIG. 1, server 128 couples directly to client workstation 130 and network 104 (which may be a LAN), which incorporates wireless communication links supporting a wireless coupling to laptop computer 126 and wireline protocols supporting a wired coupling to client workstation 112.

Client devices and servers in such distributed processing systems may be represented by a variety of computing devices, such as mainframes, personal computers, personal digital assistants, web-enabled mobile telephones, and so on. The particular servers and client devices illustrated in FIG. 1 are for explanation, not for limitation. Distributed data processing systems may include additional servers, clients, routers, other devices, and peer-to-peer architectures, not shown in FIG. 1, as will occur to those of skill in the art. Networks in such distributed data processing systems may support many data communications protocols, TCP/IP, HTTP, WAP, HDTP, and others as will occur to those of skill in the art. Various embodiments of the present invention may be implemented on a variety of hardware platforms in addition to those illustrated in FIG. 1. FIG. 1 is intended as an example of a heterogeneous distributed computing environment in which various embodiments of the present invention may be implemented, not as an architectural limitation of the present invention.

Figure 2:
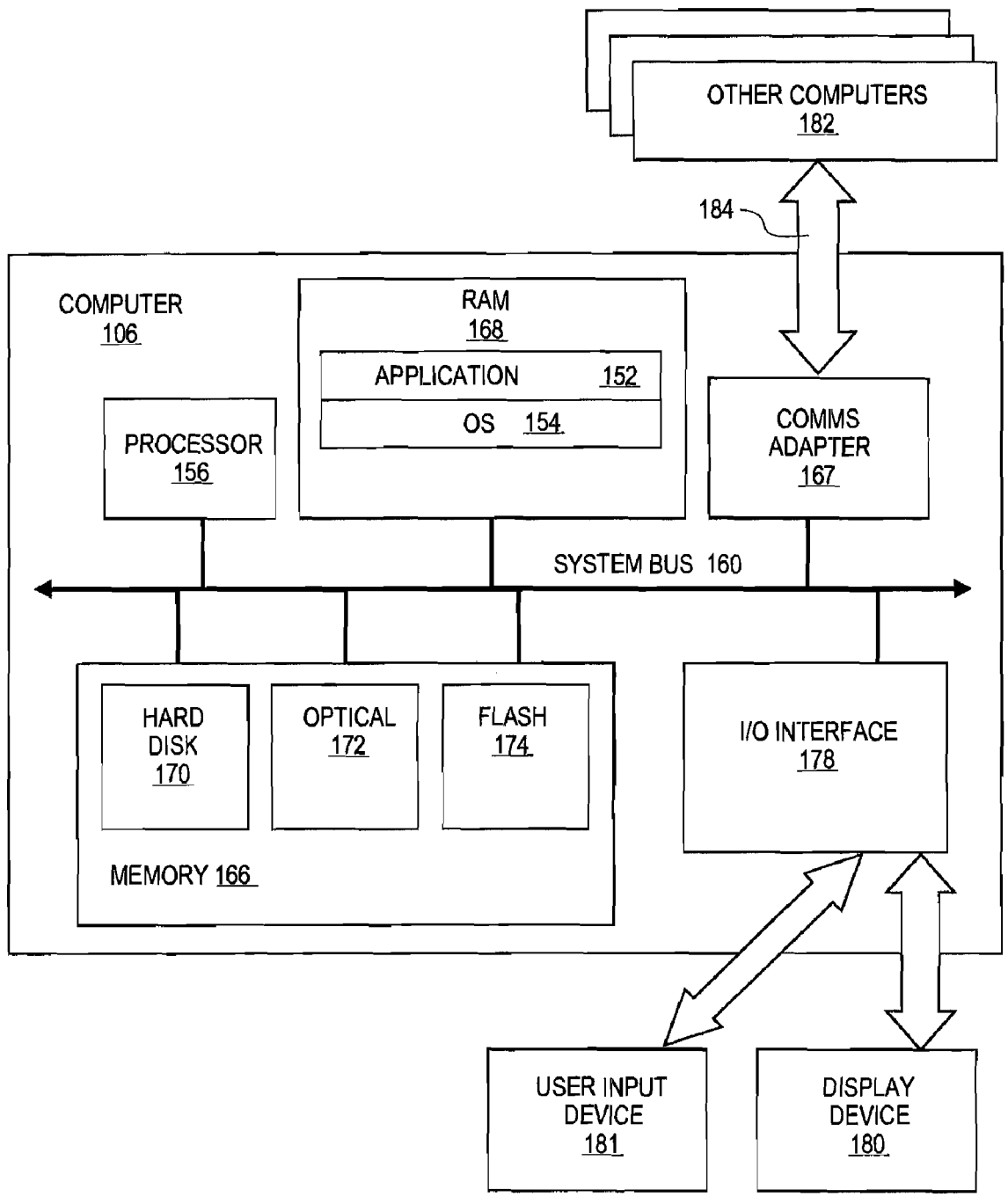
FIG. 2 sets forth a block diagram of computer useful in systems for indexing and searching for information in distributed data processing systems according to embodiments of the present invention.

FIG. 2 sets forth a block diagram of automated computing machinery comprising a computer 106, such as a client device or server, useful in systems for personalized indexing of information in distributed data processing systems according to embodiments of the present invention. The computer 106 of FIG. 2 includes at least one computer processor 156 or 'CPU' as well as random access memory 168 ("RAM"). Stored in RAM 168 is an application program 152. Application programs useful in implementing inventive methods of the present invention include servlets and CGI scripts running on servers and data communications programs such as browsers or microbrowsers running on client machines. Also stored in RAM 168 is an operating system 154. Operating systems useful in computers according to embodiments of the present invention include Unix, Linux, Microsoft NT™, and many others as will occur to those of skill in the art.

The computer 106 of FIG. 2 includes computer memory 166 coupled through a system bus 160 to the processor 156 and to other components of the computer. Computer memory 166 may be implemented as a hard disk drive 170, optical disk drive 172, electrically erasable programmable read-only memory space (so-called 'EEPROM' or 'Flash' memory) 174, RAM drives (not shown), or as any other kind of computer memory as will occur to those of skill in the art.

The example computer 106 of FIG. 2 includes communications adapter 167 implementing couplings for data communications 184 to other computers 182, servers or clients. Communications adapters implement the hardware level of couplings for data communications through which client computers and servers send data communications directly to one another and through networks. Examples of communications adapters include modems for wired dial-up connections, Ethernet (IEEE 802.3) adapters for wired LAN connections, and 802.11b adapters for wireless LAN connections.

The example computer of FIG. 2 includes one or more input/output interface adapters 178. Input/output interface adapters in computers implement user-oriented input/output through, for example, software drivers and computer hardware for controlling output to display devices 180 such as computer display screens, as well as user input from user input devices 181 such as keyboards and mice.

Figure 3:
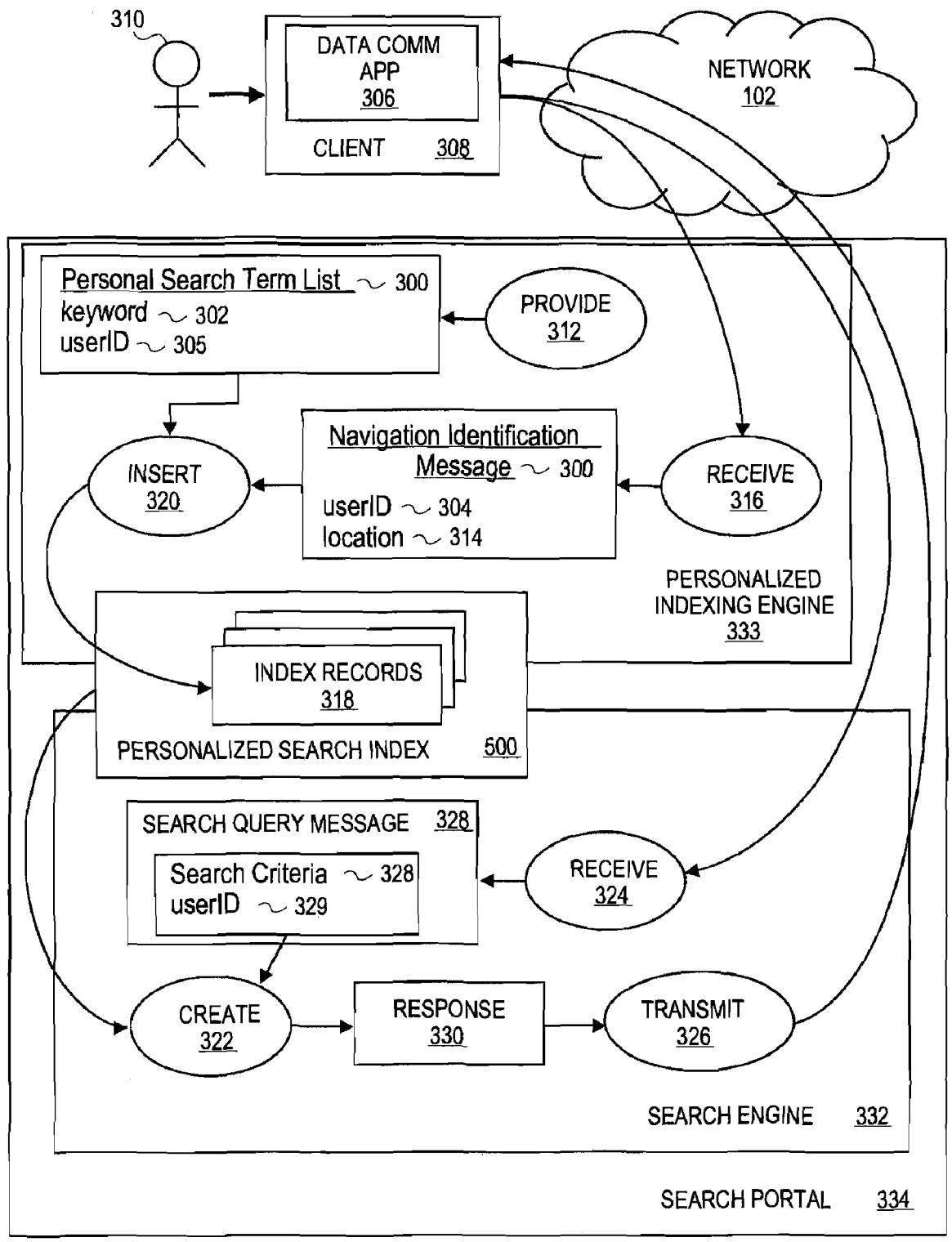
FIG. 3 depicts an exemplary software architecture in which methods, systems, and products may be implemented according to embodiments of the present invention.

For further explanation, FIG. 3 depicts an exemplary software architecture in which methods and systems may be implemented according to embodiments of the present invention for personalized searching for information in a distributed data processing system. The example of FIG. 3 provides a personal search term list 300 in a search portal 334.

A 'search portal' 334, as the term is used in this specification, means a data communications server such as a web server that supports a personalized search index 500. The search portal 334 in the example of FIG. 3 includes a search engine 332 operating in dependence upon the personalized search index 500.

The personal search term list in the example of FIG. 3 comprises search keywords 302 of interest to a user 310. The keywords 302 are identified as being of interest to the user by their inclusion in the personal search term list, and they are known to be of interest because, as explained in more detail below in this specification:

the user invoked them as contents of a hyperlink in navigating a distributed data processing system, or the user selected them from within a document, or the user provided them to the search portal as search criteria in a search query message, or the user inserted them directly into the user's personal search term list through an edit function provided for that purpose.

In the example of FIG. 3, a software module for providing 312 a personal search term list 300 operates by inserting into a table in computer memory records comprising a keyword 302 identified by one of the methods just mentioned, along with a user identification 305.

The exemplary software architecture of FIG. 3 includes a module that receives 316 from a user 310 a navigation identification message 300 comprising a user identification 304 for the search portal and a navigation location 314. More particularly, in the example of FIG. 3, receiving 316 a navigation identification message 300 is carried out by receiving a navigation identification message from a user's data communications application 306, the data communications application, such as a browser or microbrowser, installed and operating on a client computer 308. In the example of FIG. 3, the navigation identification message is communicated from the data communications application to the search portal through a network, typically utilizing a hyperlinking data communications protocol such as HTTP, WAP, HDTP, and the like.

The data communications application is configured to create and send a navigation identification message to the search portal every time its user operates the data communications application so as to navigate within a distributed data processing system. Navigating within a distributed data processing system means operating data communications applications so as to request and receive documents and other resources from computers comprising the distributed processing system. In the example of the web as a distributed processing system, navigating within the web means requesting web pages and other documents from web servers through a browser or microbrowser operating as a data communications application in a client machine. Prior art data communications applications such as browsers typically do not report users' navigation to search portals and must therefore be configured to do so. Configuring a data communications application to report users' navigation to a search portal is carried out by modifying its programming, either in its source code or through a plug-in, to store in computer memory a user identification for a user for a search portal as well as a network address for the search portal, and to create and transmit a navigation identification message to the search portal every time its user operates the data communications application so as to navigate within a distributed data processing system.

Such data communications applications may create a navigation identification message, taking browsers and HTML as examples, by use of hyperlinks. In HTML, hyperlinks are implemented with anchor elements that include 'href' attributes that identify documents or other resources requested through a hyperlink. Here is an example of an anchor element:

<a href="http://www.ibm.com/index.html">Click Here For Java Portal Report</a>

The anchor element tags, start tag and end tag, are <a> and </a>. The href attribute is an HTML attribute included within the start tag of the anchor element. The contents of the element is the string "Click Here For Java Portal Report." A browser renders the hyperlink by displaying on a browser screen the contents of the anchor element, "Click Here For Java Portal Report," in an inverse color or highlighted so as to distinguish it as a hyperlink. When a user invokes the hyperlink by, for example mouse-clicking the displayed part on the browser screen, the browser, in ordinary operation, opens a data communications connection to the server identified by the domain name in the href attribute, in this example, "www.ibm.com," and requests the document identified by "index.html." In browsers configured for use with embodiments of the present invention, the browser also opens a data communications connection, such as a TCP connection, to a search portal and transmits to the search portal the entire URI "http://www.ibm.com/index.html" along with a user identification for a user for the search portal, the two together comprising a navigation identification message, so-called because including the URI has the effect of identifying to the search portal where on the web the user is visiting. The following is an example of a navigation identification message represented as URI encoded data for transmission to a search portal in an HTTP POST or GET message:

userid=John+Smith&location=http://www.ibm.com/index.html

The exemplary software architecture of FIG. 3 includes a module that inserts 320 index records 318 in a personalized search index 500 in dependence upon the user identification 304, the navigation location 314, and the personal search term list 300. Inserting 320 index records in a personalized search index creates a personalized search index 500 as illustrated in FIG. 4. The personalized search index 500 of FIG. 4 is 'personalized' particularly in that it includes a user identification or 'userID' 572 for the search portal.

User identifications or userIDs generally in this specification are described as user identifications 'for a search portal.' A user identification for a search portal typically comprises data uniquely identifying a user to a search portal. User identifications are user identifications 'for a search portal' because embodiments of the invention advantageously support user access from any client machine. That is, for example, a user of browsers configured to operate according to embodiments of the present invention can install such browsers on a computer at work, a computer at home, and a wirelessly-coupled laptop, each of which implements a different domain name and a different user name for the user. Each such browser, however, stores in its computer memory and uses in its communications with a search portal the same user identification for the search portal, which may be the same as one of the user identification on one of the user's client machines, but may be different from all of them. In this way, the search portal is advised of user navigation for the user regardless from which client machine the navigation originates. The search portal creates a personalized search index pertinent to the user on the basis of all the user's navigation of the web, even when the navigation occurs across a multiplicity of client machines. And the search portal's search engine can provide improved search focus to the user regardless of the client machine from which search requests originate.

The example personalized search index 500 of FIG. 4 includes keywords 570 indexed with navigation locations, in this example, URIs, identifying the location in cyberspace where the keywords are found. More particularly, the keywords are extracted from documents identified by URIs that match keywords stored in a personal search term list for a user—and then inserted into records in a personalized search index along with a userID and a URI. It is in this sense that a personalized search index 500 is created in dependence upon user identification 304, navigation location 314, and a personal search term list 300.

The exemplary architecture of FIG. 3 includes a module that receives 324 in the search portal 334 from the user 310 a search query message 328 comprising search criteria 328 and user identification 329 for the search portal. A search query message 328 can be implemented, for example, as an HTTP request message or GET message bearing search criteria 328 as search keywords URI encoded. Here is an example of URI encoding in a search query message for search criteria 'IBM' and 'Java' with userID of 'tim':

query=IBM+Java&userID=tim

The example of FIG. 3 includes a software module that creates 322, in dependence upon the personalized search index 500, the search criteria 328, and the user identification 329, a response 330 to the search query message. Creating a response to a search query message typically is carried out by parsing search criteria and user identification from the search query message into a database query. A database query may be expressed in a database query language such as, for example, SQL. The example search query message set forth above, having search criteria 'IBM' and 'Java' with userID of 'tim,' parsed into SQL may be represented as:

SELECT ALL FROM personalizedIndex
 WHERE keyword IN ('IBM', 'Java')
 AND userID='tim';

This SQL query retrieves from a personalized search index named 'personalizedIndex' records having keywords 'IBM' or 'Java' and userID of 'tim.' If the example index of FIG. 4 is taken as 'personalizedIndex,' for example, this example SQL query would select records 558 and 568. Both records 558 and 568 identify the URI "www.ibm.com," which is then combined with a title and description (not shown) and incorporated into a response 330 to the search query message.

The example of FIG. 3 includes a software module that transmits 326 the response 330 to the user 310. Transmitting 326 a search response 330 to a user 310 is typically carried out by transmitting a response message in a hyperlinking protocol such as HTTP, WAP, HDTP, and the like. Such a response message typically includes the search results expressed in a markup language, such as, for example, HTML or WML, for display on a browser.

Figure 5:
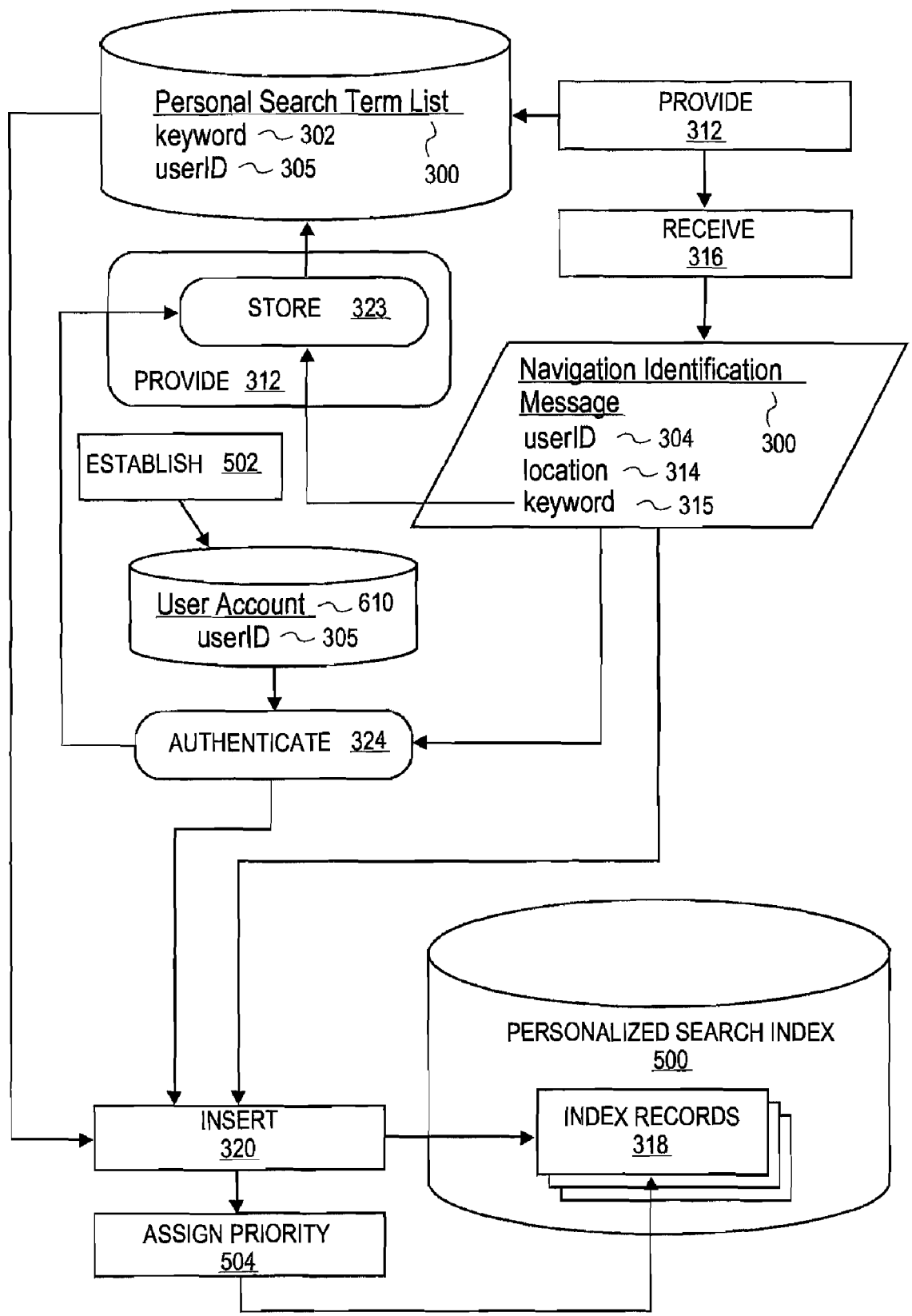
FIG. 5 sets forth a flow chart illustrating an exemplary method of personalized searching for information in a distributed data processing system.

For further explanation, FIG. 5 sets forth a flow chart illustrating an exemplary method of personalized searching for information in a distributed data processing system that includes providing 312 in a search portal 334 a personal search term list 300. The method of FIG. 5 also includes receiving 316 from a user 310 a navigation identification message 300 comprising a user identification 304 for the search portal and a navigation location 314 and inserting 320 index records 318 in a personalized search index 500 in dependence upon the user identification 304, the navigation location 314, and the personal search term list 300.

The method of FIG. 5 also includes establishing 502 a user account 610 for the user on the search portal, the user account comprising user identification 305 for users of the portal. A user account 610 is typically implemented as a database table or other data structure retained in computer memory. The userID 305 in the user account, as mentioned above, is unique to a user within the search portal. Each user may have multiple user names, logon ids, or other user identifications used in multiple domains, wirelessly coupled laptops, PDAs, mobile phones, home PCs, workstations on LANs at work, and so on. Establishing a single userID for the search portal allows entering that userID into each data communications application in each domain and therefore making all navigation within the web available to the search portal regardless from which domain the navigation originates. User accounts optionally include passwords, retinal scans, digitally-encoded fingerprints, security tokens, or other security data as will occur to those of skill in the art. The user identification advantageously is sufficient to uniquely identify the user, and user identification can be implemented as confidential PIN numbers or other relatively secure formats. Passwords and other security data therefore are said to be optional, depending on the level of security deemed to be needed by an operator of any particular search portal according to embodiments of the present invention.

The method of FIG. 5 includes authenticating 324 the navigation identification message 300. Some indexing systems according to embodiments of the present invention may operate without authentication. Such systems accept navigation identification messages from any user. Because users can transmit navigation identification messages from any client, however, users may inadvertently transmit navigation identification messages with the wrong user identification. In systems without authentication, such navigation identification messages are accepted for indexing, although the resulting index records may be inserted with the wrong user identification. As an aid to accuracy and order, determining that a navigation identification message is from the user it purports to be from and that it will effect correct indexing, therefore, many indexing systems according to embodiments of the present invention do authenticate 324 navigation identification messages by determining whether user identification 304 in a navigation identification messages exists in a user account record 610. In systems that use additional security data, such as passwords, authentication includes comparing a password (not shown) from a navigation identification message with a password from a user account 610 for the user identified by the userID 304 in the navigation identification message.

As an aid to clarity in presentation of search results, the method of FIG. 5 includes assigning 504 priority to index records 318 in the personalized search index. In some indexing systems according to embodiments of the present invention, assigning priority comprises counting the number of times a navigation location 315 is received in navigation identification messages 300. Consider the exemplary personalized search index 500 of FIG. 4, whose data structure contains a field for storing a priority value, shown as column 574 on FIG. 4. Indexing systems that assign priority by counting the number of times a navigation location 315 is received in navigation identification messages 300 may do so by incrementing a priority value 574 in every record bearing a particular navigation location (represented as URIs 576 in the example of FIG. 4) every time a navigation identification message 300 is received with that navigation location. In the example of the web, this procedure has the effect of incrementing the priority value of index records for a particular web document, resource, or web site, every time a user visits the web site or requests the document or resource. The more often a user accesses a particular web document, resource, or site, the higher its priority value becomes.

In other indexing systems according to embodiments of the present invention, assigning priority comprises counting the number of times a keyword from the personal search term list occurs in a document. In other indexing systems according to embodiments of the present invention, assigning priority comprises determining the location of search keywords in a navigated document or web site, assigning higher priority for keywords that occur early in the document or web site. In these methods of assigning priority, the priority value is derived from the characteristics of the documents requested or sites visited rather than the behavior of a user. Other methods of assigning priority will occur to those of skill in the art, and all such methods are well within the scope of the present invention.

In the method of FIG. 5, the navigation identification message 300 also includes a search keyword 315 and providing a personal search term list further comprises storing 323 the search keyword 315 in the personal search term list 300. Consider again the example of an HTML anchor element effecting a hyperlink to a document described as a 'Java Portal Report':

<a href="http://www.ibm.com/index.html">Click Here For Java Portal Report</a>

In this example, a browser or other data communications application is configured, to transmit a navigation identification message that includes not only the URI and a userID as described above, but also the text string from the body of the element, "Click Here For Java Portal Report." The fact that a user invokes the hyperlink is taken as an expression of interest in the subject represented by the words in the body of the hyperlink, and the words in the body of the hyperlink therefore are transmitted to a search portal for inclusion in the user's personal search term list. The following is an example of a navigation identification message represented as URI encoded data for transmission to a search portal in an HTTP POST or GET message, including user identification, navigation location, and search keywords from the hyperlink:

userid=John+Smith&location=http://www.ibm.com/index.html
&keywords=Click+Here+For+Java+Portal+Report In typical embodiments, a personal search term list 300 is implemented as a database table having two columns, one column for userIDs and one for keywords. Storing 323 search keywords 315 in such a personal search term list 300 is carried out by inserting new records bearing the search terms and a userID. In such a personal search term list, assuming an indexing engine that inserts all keywords from navigation identification messages, the navigation identification message above may result in the insertion of six new records in a personal search term list:

| UserID | Keyword |
|---|---|
| JohnSmith | Click |
| JohnSmith | Here |
| JohnSmith | For |
| JohnSmith | Java |
| JohnSmith | Portal |
| JohnSmith | Report |

Figure 6:
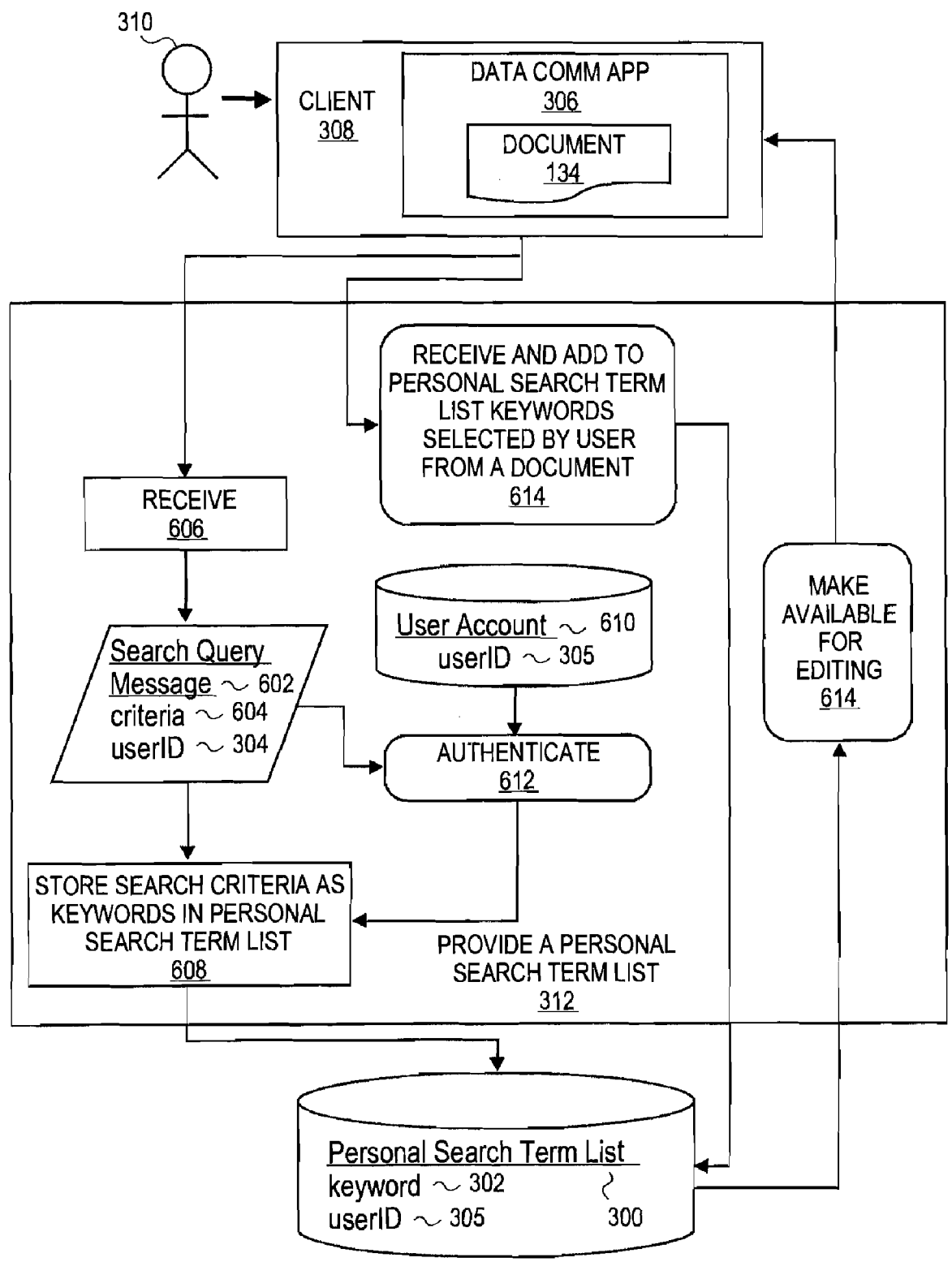
FIG. 6 sets forth a flow chart illustrating methods of providing a personal search term list.

FIG. 6 sets forth a flow chart illustrating further methods of providing 312 a personal search term list. One method illustrated in FIG. 6 comprises receiving 606 in a search portal from a user a search query message comprising search criteria 604 and user identification 304 and storing 608 the search criteria in the personal search term list. Here again is an example of URI encoding in a search query message for search criteria 'IBM' and 'Java' with userID of 'tim':

query=IBM+Java&userID=tim

In this example, storing 608 the search criteria in the personal search term list inserts these new records in the personal search term list:

| UserID | Keyword |
|---|---|
| tim | IBM |
| tim | Java |

The illustrated example includes authenticating 612 the search query message. Because this kind of search query message affects the contents of a personal search term list which in turn affects the contents of a personalized search index which in turn affects the search experience of a user, it is an advantage to reduce the risk that any particular search query message will affect the contents of a personal search term list for the wrong user. Many indexing systems according to embodiments of the present invention therefore authenticate search query messages by checking the userID from a search query message against the userID in user account records. In addition to userIDs, some systems use other security data also such as, for example, passwords, Kerberos tokens, digital signatures, biometric data representing retinal scans or fingerprints, and so on as will occur to those of skill in the art.

Figure 9:
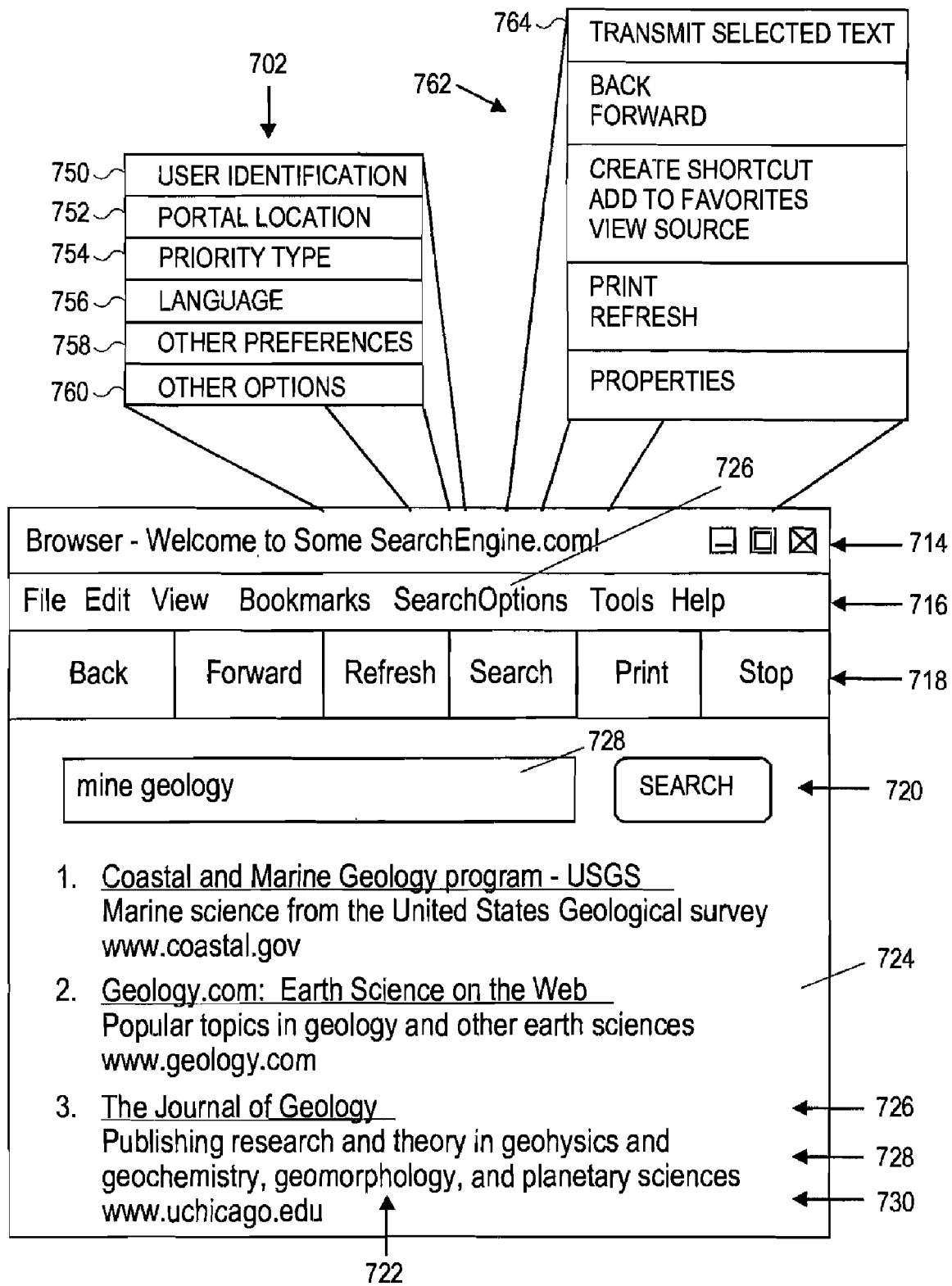
FIG. 9 depicts an exemplary GUI on a client running a data communication application.

A further method for providing a personal search term list, also shown on FIG. 6, includes receiving from the user and adding 614 to the personal search term 300 list a keyword selected by the user 310 from within a document 134. FIG. 9 depicts an exemplary GUI on a client machine running a data communication application, more particularly, in the example of FIG. 9, a browser. The browser of FIG. 9 is an example of a data communications application in a client machine that is capable of providing selected keywords to be received in a search portal and added to a personal search term list for a user. The example browser of FIG. 9 is one that has been programmed, or modified with a plug-in, to accept and transmit keywords selected by a user. The browser of FIG. 9, as depicted, has been operated to point to a web site named "SomeSearchEngine.com," as shown in the title bar of the browser display 714. The browser of FIG. 9 includes a GUI toolbar 718 with a Back button, a Forward button, and buttons for refreshing the display, searching, printing, and stopping web page retrievals. The browser of FIG. 9 also includes a horizontal menu 716 containing the menu items File, Edit, View, Bookmark (sometimes called 'Favorites'), SearchOptions, Tools, and Help.

The menu entry called SearchOptions 726 is programmed to display a menu 702 of search options operable in support of personalized indexing and searching according to embodiments of the present invention. The search options settable through menu 702 include user identification 750, a search portal location 752, a priority type 754, a language preference 756, other preferences 758, and other miscellaneous search options 760. Selecting the menu entry for user identification 750 enables a user to input through a data entry form and store in computer memory with the browser's other operating options and parameters a user identification for a search portal, a user identification that may be the same as or different from the one the user uses in the local domain or on the client machine where the browser is running and may be the same user identification for a search portal used by the particular user from this browser and from other browsers on other client machines. Similarly, selecting the menu entry for portal location 752 enables a user to input through a data entry form and store in computer memory with the browser's other operating options and parameters a network address for a search portal to which navigation identification messages are to be sent. The network address may be implemented as, for example, a domain name for the search portal, a URI for the search portal, a dotted decimal internet protocol address for the search portal, or in other ways as will occur to those of skill in the art.

The browser of FIG. 9 displays three exemplary entries 722 from a search result message generated in response to the query, "mine geology," displayed in a query entry field 732. Each entry in the search results includes a title 726 for the document described by the entry, one or two lines of descriptive text 728, and a URI identifying the document described by the entry.

The browser of FIG. 9 is configured to transmit for receipt in a search portal keywords selected by a user from within a document by use of text selection and GUI controls such as mouse motions and keyboard manipulations. In particular, a right-mouse-button-click anywhere on the display portion 724 of the browser screen presents pull-down menu 762 comprising the usual menu items for browser control, Back, Forward, Create Shortcut, Add to Favorites, and so on, but also presenting a new menu item 764 labeled 'Transmit Selected Text.' Highlighting text in the display area 724, right-clicking to gain menu 762, and invoking Transmit Selected Text 764 with, for example, a mouse-click, causes the browser to open a TCP connection to a search portal (in this example, the search portal identified through the 'Portal Location' item 752 on menu 702, concatenate the selected text into URI encoded data, and transmit the selected text to the search portal in an HTTP message, where the search portal receives and adds keywords from the selected text to a personal search term list for a user.

For further explanation, consider an example of a user whose userID for the search portal is 'JohnSmith.' JohnSmith selects the text in the description line 728 on the browser screen of FIG. 9 with a mouse-click-and-drag, right-clicks on the display area 724, and then selects 'Transmit Selected Text' 764 from menu 762. The browser then transmits to the search portal in an HTTP message the following URI encoded data:

userid=JohnSmith&keywords=geochemistry+geomorphology+and+planetary+sciences

The search portal receives, the URI encoded keywords, extracts them from the HTTP message, and adds them as entries with the userID to a personal search term list for a user, resulting in the following new entries in JohnSmith's personal search term list:

| UserID | Keyword |
|---|---|
| JohnSmith | geochemistry |
| JohnSmith | geomorphology |
| JohnSmith | and |
| JohnSmith | planetary |
| JohnSmith | sciences |

Readers of skill in the art will notice that not much search power is added by including 'and' in a personal search term list. Many indexing systems according to embodiments of the present invention exclude certain frequently occurring terms both from personal search term lists and from personalized search indexes, such as, for example, 'the,' 'a,' 'an,' and so the like. For clarity of explanation, however, and not as a limitation of the invention, the examples in this disclosure simply include all identified keywords in indexes and in personal search term lists.

A further method for providing a personal search term list, also shown on FIG. 6, includes making the personal search term list available 300 to the user for editing 614. Making a personal search term list available for editing may be carried out by any means of editing data in tables as will occur to those of skill in the art, including, for example, presenting the contents of a personal search term list through a CGI script or servlet in a <FORM> element in an HTML document for editing directly through the screen of a user's browser, where the user can then directly insert new keywords, delete keywords no long of interest, or edit existing keywords in the user's personal search term list.

Figure 7:
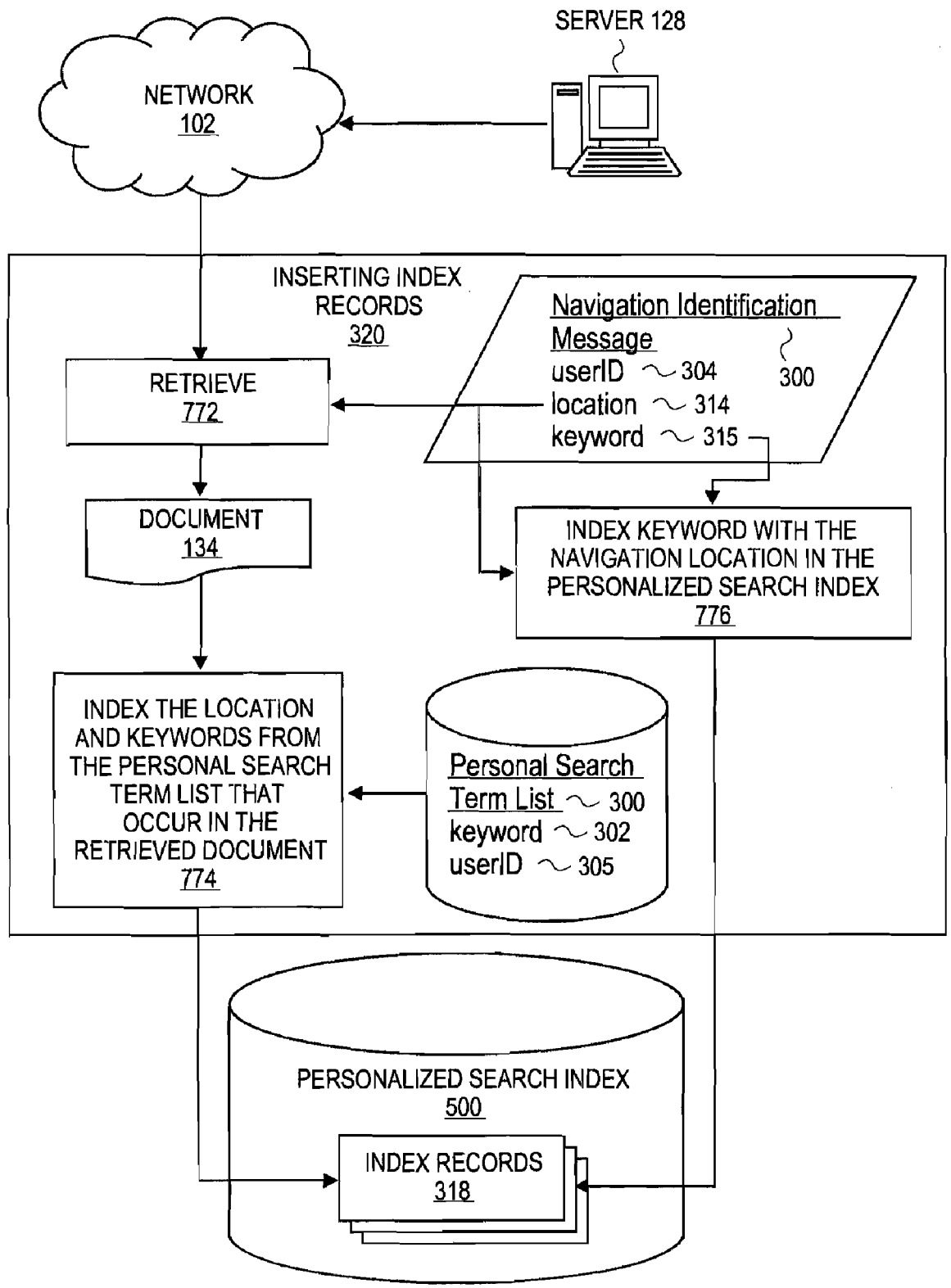
FIG. 7 sets forth a flow chart illustrating an exemplary method of inserting index records in a personalized search index.

For further explanation, FIG. 7 sets forth a flow chart illustrating an exemplary method of inserting (320 on FIG. 5) index records in a personalized search index that includes retrieving 772 a document from a navigation location and indexing 774, in the personalized search index, a navigation location and keywords from the personal search term list that occur in the retrieved document. This exemplary step advantageously is carried out when a navigation identification message is received from a user (316 on FIG. 5). In the example of the world wide web as a distributed processing system, a navigation location 314 in a navigation identification message 300 is typically implemented as a URI identifying a web document such as an HTML document, a web page, or a CGI script or servlet that will dynamically assemble and deliver a web page or document. The exemplary method of FIG. 7 then includes retrieving a web document identified by the location URI in a navigation identification message and, to the extent that the web document includes keywords that are also in the personal search term list 300 for the user identified by the userID 304 in the navigation identification message, inserting into a personalized search index 500 new records for each such keywords. The new records have structure, for example, like that shown in FIG. 4, including the keywords 570, the userID 572, the URI where is found the document containing each keyword, and optionally a priority rating 574. If an index record already exists for a particular combination of keyword, userID, and URI, then the method optionally includes taking other action, such as, for example, incrementing a priority value.

FIG. 7 illustrates a further method for inserting 320 index records 318 in a personalized search index 500. In this example, the navigation identification message 300 contains a search keyword 315 and inserting 320 index records 318 in a personalized search index 500 further comprises indexing 776 the search keyword 315 with the navigation location 314 in the personalized search index. Consider again the example of an HTML anchor element effecting a hyperlink to a document described as a 'Java Portal Report':

<a href="http://www.ibm.com/index.html">Click Here For Java Portal Report</a>

In this example, a browser or other data communications application is configured, to transmit a navigation identification message that includes the URI, a userID, and the text string from the body of the hyperlink: "Click Here For Java Portal Report." The fact that a user invokes the hyperlink is taken as an expression of interest in the subject represented by the words in the body of the hyperlink, and the words in the body of the hyperlink therefore are transmitted to a search portal for inclusion in the user's personalized search index. The following is an example of a navigation identification message represented as URI encoded data for transmission to a search portal in an HTTP POST or GET message, including user identification, navigation location, and search keywords from the hyperlink:

userid=John+Smith&location=http://www.ibm.com/index.html
    &keywords=Click+Here+For+Java+Portal+Report In typical embodiments, a personalized search index 500 is implemented as a database table having columns such as those illustrated in FIG. 4 for keywords 570, userIDs 572, URIs 576, and other columns may include priority values, titles of documents, descriptive text, and so on as will occur to those of skill in the art. According to the illustrated method from FIG. 7, therefore, indexing 776 the search keyword 315 with the navigation location 314 in the personalized search index may be carried out, for example, by extracting the keywords from their URI encoding in an HTTP message and adding them in new records, along with userID, URI, and so on, to a personalized search index, one new record for each new keyword.

Personalized Information Searching

Figure 8:
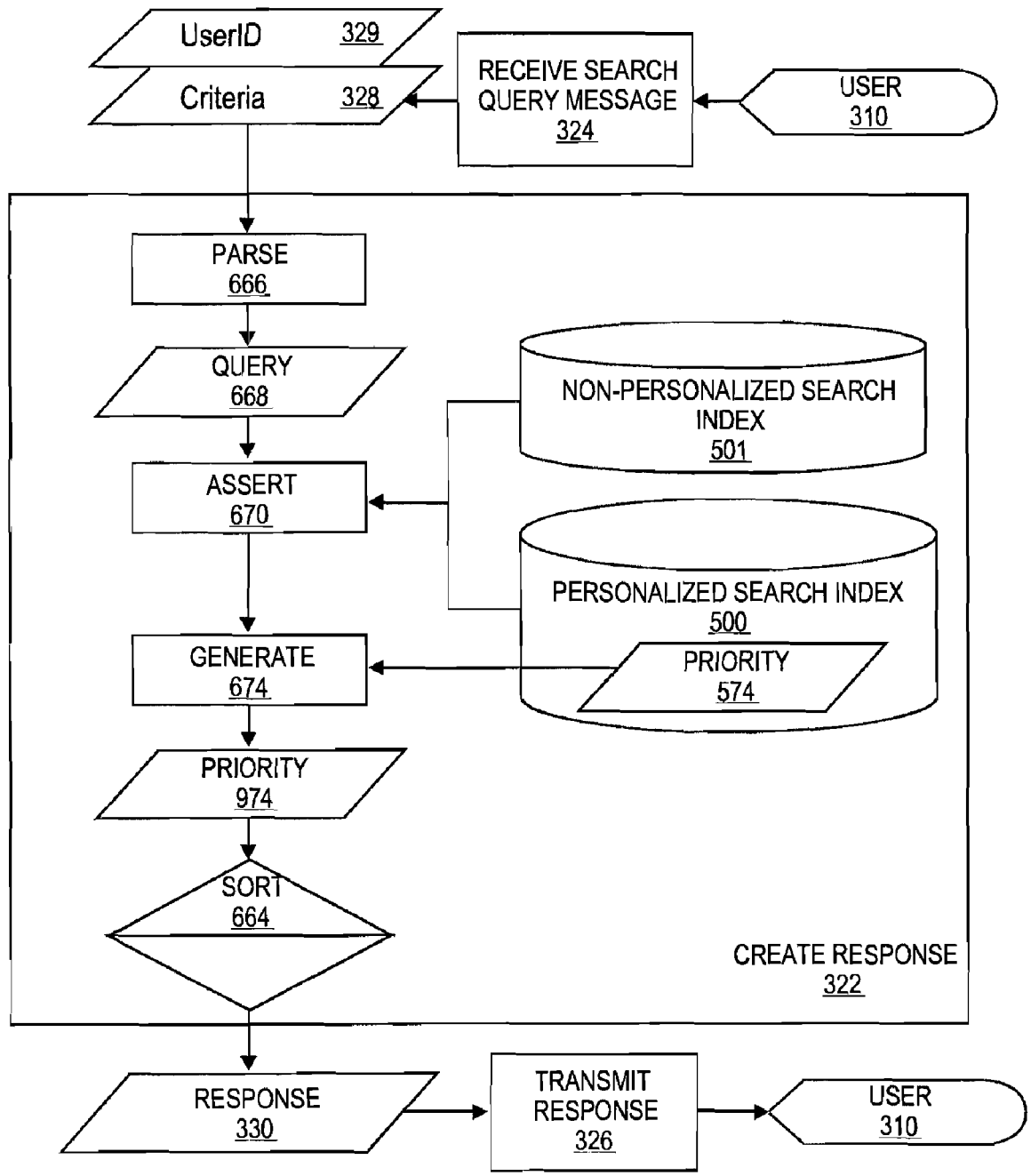
FIG. 8 sets forth a flow chart illustrating an exemplary method of operating a search engine advantageously in dependence upon a personalized search index.

FIG. 8 sets forth a flow chart illustrating an exemplary method of operating a search engine advantageously in dependence upon a personalized search index. The method of FIG. 8 includes receiving 324 in a search portal from a user 310 a search query message 328 comprising search criteria 328 and user identification 329. The method of FIG. 8 also includes creating 322, in dependence upon the personalized search index 500, the search criteria 328, and the user identification 329, a response 330 to the search query message. The illustrated method includes transmitting 326 the response 330 to the user 310.

In the method of FIG. 8, creating 322 a response to the search query message comprises creating a response to the query in dependence upon only the personalized search index 500. Alternatively, in some search engines according to the method of FIG. 8, creating 322 a response to the search query message is carried out by use of both a personalized search index and a non-personalized search index 501. A non-personalized search index 501 is any search index that does not organized its index records according to user identification; examples include Google™, Alta-Vista™, Yahoo!™, and so on, as will occur to those of skill in the art. A non-personalized search index 501 may be located remotely from a search engine of the present invention or may be installed in the same execution domain or even on the same server with a search engine of the present invention. In creating responses to search queries, search engines that use both a personalized search index and a non-personalized search index may give higher priority to response entries derived from a personalized search index, on the theory that such entries are derived from an index comprising keywords known to be of interest to a user. On the other hand, and typically at the behest of a user, such search engines may give response priority to response entries derived from a non-personalized search index, because a user in a particular search or series of searches may wish to have presented first information from sites that the user has not visited before.

In the example of FIG. 8, creating 322 a response to the search query message comprises parsing 666 the search criteria into a search query 668. Given the following search query message URI encoded:

query=mine+geology &userID=tim and the following template for SQL database queries against a personalized search index:

SELECT ALL FROM personalizedIndex
WHERE keyword IN (/* insert keywords here */)
AND userID=/* insert userID here */;

parsing 666 the search criteria into a search query 668 may be carried out by extracting the keywords and the userID from the search query message and inserting them into the database query template to form the following exemplary SQL database query:

SELECT ALL FROM personalizedIndex
WHERE keyword IN ('mine', 'geology')
AND userID='tim';

In the example of FIG. 8, a database query so created by parsing the contents of a search query message is then asserted asserting 670 against a personalized search index 576. To the extent that the query is asserted also against a non-personalized search index 501, the query is modified, for example, by directing it to the non-personalized index and by excluding the userID:

SELECT ALL FROM nonPersonalizedIndex
WHERE keyword IN ('mine', 'geology');
This example SQL database query:
SELECT ALL FROM personalizedIndex
WHERE keyword IN ('mine', 'geology')
AND userID='tim';

retrieves from a personalized search index named 'personalizedIndex' records having keywords 'mine' or 'geology' and userID 'tim.' In this example, the personalized search index 'personalizedIndex' is exemplified by the table shown in FIG. 10, having columns for keywords 570, userIDs 572, priority values 574, and URIs identifying the documents from which the keywords were indexed. Asserting this example SQL query against the index of FIG. 10 extracts the records shown in FIG. 11.

In the example according to FIG. 8, creating a response to the search query message comprises generating 674, in dependence upon assigned indications of priority 574 for the index entries in the personalized search index, measures of priority 974 for entries in the response 330. The records in FIG. 11, which were extracted from the personalized search index illustrated in FIG. 9, include assigned indications of priority 574 for index entries, that is, for entries in a semantics-based search index. Generating 674, in dependence upon assigned indications of priority 574 for the index entries, measures of priority 974 for entries in the search result message 662 can be carried out, for example, by summing the assigned indications of priority 574 for index entries across a locations of keywords, that is, in this example, across URIs. More particularly, summing the assigned indications of priority 574 for index entries across URIs can be carried out by use of a GROUP BY clause in conjunction with a SQL 'sum' keyword in a SQL query:

SELECT title, description, URL, sum(priority) as responsePriority
FROM tempTable GROUP BY URI This example SQL query extracts from the records shown in table 11 (taken as 'tempTable') one record for each URI, adds a column named 'responsePriority,' and stores in the new column the sum of the assigned indications of priority 574 for index entries for each URI in the table of FIG. 11. The 'priority' in 'sum(priority)' is a reference to the indication of priority for search index records in column 574 in FIG. 11. The 'title' and 'description' fields are not shown in FIG. 11, but are assumed to be present for purposes of this example.

Asserting this example SQL query against the table of FIG. 11, extracts the records shown in FIG. 12. In FIG. 12, the column labeled 'responsePriority' 974 is now a measure of priority for entries in a response 330, according to the exemplary method of FIG. 8. In this example, the measure of priority 974 for entries in a response message were created by summing measures of relevance for index records for each URL in the table of FIG. 11.

In the example of FIG. 8, creating a response to the search query message comprises sorting 664 response entries according to a measure of priority 974 for entries in the search result message. Sorting 664 response entries according to measures of priority 974 can be carried out, for example, by use of an ORDER BY cause in a SQL query as illustrated in the following example:

SELECT title, description, URL, sum(priority) as responsePriority
FROM tempTable
GROUP BY URI
ORDER BY responsePriority DESC This example SQL query extracts from the records shown in table 11 one record for each URI, adds a column named 'responsePriority,' stores in the new column the sum of the assigned indications of priority 574 for index entries for each URI in the table of FIG. 11, and sorts the extracted records in descending order according to responsePriority, which as mentioned above, is a measure of priority for entries in a search result message.

For clarity of explanation, the process of parsing search criteria and userIDs into a search query has been shown in stages with reference to FIGS. 10-12. As a practical matter, however, search criteria and userIDs may be parsed directly into a single SQL query. The following URI encoded search criteria and userID, for example:

query=mine+geology &userID=tim may be parsed directly into the following exemplary SQL query:

SELECT title, description, URL, sum(priority) as responsePriority
FROM (SELECT ALL FROM personalizedIndex
WHERE keyword IN ('mine', 'geology')
AND userID='tim';)
GROUP BY URI
ORDER BY responsePriority DESC This SQL query, when asserted against a personalized search index like the one illustrated in FIG. 10, directly produces the result shown in FIG. 12, carrying out all the intermediate steps described above, retrieving records having keywords 'mine' or 'geology' and userID 'tim,' extracting one record for each URI, adding a column for priority for response entries named 'responsePriority,' storing in the new column the sum of assigned indications of priority for index entries for each URI, sorting the extracted records in descending order according to response priority, and so on, The exemplary method of FIG. 8 also includes transmitting 326 to the client 310 the response to the search query message. Transmitting 326 a search response 330 to a client 310 is carried out according to typical embodiments of the present invention by transmitting a response message in a hyperlinking protocol such as HTTP, WAP, HDTP, and the like. Such a response message typically includes the search results expressed in a markup language, such as, for example, HTML or WML, for display through a browser, microbrowser, or other communications application. The GUI in FIG. 9, for example, shows the search results from FIG. 12 displayed on a browser screen sorted in descending order according to search result priority.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of personalized searching for information in a distributed data processing system, the method comprising:
providing in a server-side search portal a personal search term list, wherein the personal search term list includes a user identifier that is associated with a search keyword;
receiving from a user a navigation identification message comprising a user identification for the server-side search portal, a search keyword, a user identification, a password, and a navigation location;
inserting an index record in a personalized search index in dependence upon the user identification, the navigation location, and the personal search term list, wherein the index record associates the user identification with the navigation location and with the one or more search keywords from the personal search term list; and
assigning priority to index entries in the personalized search index including counting the number of times each navigation location is received in navigation identification messages.

2. The method of claim 1 wherein inserting an index record in a personalized search index further comprises:
retrieving a document from the navigation location; and
indexing, in the personalized search index, the navigation location and keywords from the personal search term list that occur in the retrieved document.

3. The method of claim 1 wherein the navigation identification message further comprises a search keyword and inserting index records in a personalized search index further comprises indexing the search keyword with the navigation location in the personalized search index.

4. The method of claim 1 wherein providing a personal search term list further comprises:
receiving in the server-side search portal from the user a search query message comprising search criteria and the user identification; and
storing the search criteria in the personal search term list.

5. The method of claim 1 wherein the navigation identification message further comprises a search keyword and providing a personal search term list further comprises storing the search keyword in the personal search term list.

6. The method of claim 1 wherein providing a personal search term list further comprises receiving from the user and adding to the personal search term list a keyword selected by the user from within a document.

7. The method of claim 1 wherein providing a personal search term list further comprises making the personal search term list available to the user for editing.

8. The method of claim 1 wherein the server-side search portal comprises a server further comprising a search engine operating in dependence upon the personalized search index.

9. The method of claim 1 wherein the personal search term list comprises search keywords of interest to the user.

10. The method of claim 1 wherein assigning priority comprises counting the number of times a keyword from the personal search term list occurs in a document.

11. A system for personalized searching for information in a distributed data processing system, the system comprising:
a computer processor;
a computer memory operatively coupled to the computer processor, the computer memory having disposed within it computer program instructions for:
providing in a server-side search portal a personal search term list, wherein the personal search term list includes a user identifier that is associated with a search keyword;
receiving from a user a navigation identification message comprising a user identification for the server-side search portal, a search keyword, a user identification, a password, and a navigation location;
inserting an index record in a personalized search index in dependence upon the user identification, the navigation location, and the personal search term list, wherein the index record associates the user identification with the navigation location and with the one or more search keywords from the personal search term list; and
assigning priority to index entries in the personalized search index including counting the number of times each navigation location is received in navigation identification messages.

12. A computer program product for personalized searching for information in a distributed data processing system, the computer program product disposed upon a recording medium, the computer program product comprising computer program instructions capable, when executed, of causing a computer to carry out the steps of:
providing in a server-side search portal a personal search term list, wherein the personal search term list includes a user identifier that is associated with a search keyword;
receiving from a user a navigation identification message comprising a user identification for the server-side search portal, a search keyword, a user identification, a password, and a navigation location;

inserting an index record in a personalized search index in dependence upon the user identification, the navigation location, and the personal search term list, wherein the index record associates the user identification with the navigation location and with the one or more search keywords from the personal search term list; and assigning priority to index entries in the personalized search index including counting the number of times each navigation location is received in navigation identification messages.

13. The computer program product of claim 12 wherein inserting an index record in a personalized search index further comprises:

retrieving a document from the navigation location; and indexing, in the personalized search index, the navigation location and keywords from the personal search term list that occur in the retrieved document.

14. The computer program product of claim 12 wherein the navigation identification message further comprises a search keyword and inserting an index record in a personalized search index further comprises indexing the search keyword with the navigation location in the personalized search index.

15. The computer program product of claim 12 wherein providing a personal search term list further comprises:

receiving in the server-side search portal from the user a search query message comprising search criteria and the user identification; and storing the search criteria in the personal search term list.

16. The computer program product of claim 12 wherein the navigation identification message further comprises a search keyword and providing a personal search term list further comprises storing the search keyword in the personal search term list.

17. The computer program product of claim 12 wherein providing a personal search term list further comprises receiving from the user and adding to the personal search term list a keyword selected by the user from within a document.

18. The computer program product of claim 12 wherein providing a personal search term list further comprises making the personal search term list available to the user for editing.

* * * * *